United States Patent
Menon Gopalakrishna

(10) Patent No.: US 10,311,551 B2
(45) Date of Patent: Jun. 4, 2019

(54) MACHINE VISION BASED TRACK-OCCUPANCY AND MOVEMENT VALIDATION

(71) Applicant: Westinghouse Air Brake Technologies Corporation, Wilmerding, PA (US)

(72) Inventor: Prahlad G. Menon Gopalakrishna, Pittsburgh, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 13 days.

(21) Appl. No.: 15/377,451

(22) Filed: Dec. 13, 2016

(65) Prior Publication Data

US 2018/0165532 A1    Jun. 14, 2018

(51) Int. Cl.
- *G06T 5/00* (2006.01)
- *G06T 7/00* (2017.01)
- *B60L 15/00* (2006.01)
- *G06K 9/00* (2006.01)
- *B61L 15/00* (2006.01)
- *B61L 23/00* (2006.01)
- *B61L 23/04* (2006.01)

(52) U.S. Cl.
CPC .......... *G06T 5/002* (2013.01); *B61L 15/0072* (2013.01); *B61L 23/00* (2013.01); *B61L 23/041* (2013.01); *G06K 9/00791* (2013.01); *G06T 7/0004* (2013.01); *G06T 2207/10024* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| | | |
|---|---|---|
| 3,562,419 A | 2/1971 | Stewart et al. |
| 4,165,694 A | 8/1979 | Theurer |
| 4,915,504 A | 4/1990 | Thurston |
| 5,721,685 A | 2/1998 | Holland et al. |
| 5,790,403 A | 8/1998 | Nakayama |
| 5,991,427 A | 11/1999 | Kakinami et al. |

(Continued)

FOREIGN PATENT DOCUMENTS

| | | |
|---|---|---|
| WO | 2005119630 A1 | 12/2005 |
| WO | 2007091072 A1 | 8/2007 |
| WO | 2008120971 A1 | 10/2008 |

*Primary Examiner* — Mussa A Shaawat
*Assistant Examiner* — Abdhesh K Jha
(74) *Attorney, Agent, or Firm* — The Webb Law Firm

(57) ABSTRACT

A train monitoring system includes an image sensor positioned on a rail vehicle to sense an area in front. The image sensor generates sensor signals. At least one non-transitory computer-readable medium has program instructions that, when executed by at least one processor in communication with the image sensor, causes the at least one processor to: (a) generate static image data based on the sensor signals, the static image data including a line representation of rails located in the area in front of the rail vehicle; (b) determine track occupancy of the rail vehicle by determining the set of rails occupied by the rail vehicle based on the static image data; and (c) determine an upcoming direction of movement of the rail vehicle by determining a direction of the set of rails occupied by the rail vehicle based on the static image data.

27 Claims, 7 Drawing Sheets

(56) References Cited

U.S. PATENT DOCUMENTS

| | | | |
|---|---|---|---|
| 6,128,558 A * | 10/2000 | Kernwein | B61L 25/025 701/19 |
| 6,356,299 B1 | 3/2002 | Trosino et al. | |
| 6,526,352 B1 | 2/2003 | Breed et al. | |
| 6,634,112 B2 | 10/2003 | Carr et al. | |
| 6,681,160 B2 | 1/2004 | Bidaud | |
| 6,798,897 B1 | 9/2004 | Rosenberg | |
| 6,909,514 B2 | 6/2005 | Nayebi | |
| 7,050,926 B2 | 5/2006 | Theurer et al. | |
| 7,164,975 B2 | 1/2007 | Bidaud | |
| 7,395,140 B2 | 7/2008 | Christie et al. | |
| 7,403,296 B2 | 7/2008 | Farritor et al. | |
| 7,415,335 B2 | 8/2008 | Bell et al. | |
| 7,440,634 B2 | 10/2008 | Ben-Ezra et al. | |
| 7,463,348 B2 | 12/2008 | Chung | |
| 7,542,831 B2 | 6/2009 | Christie et al. | |
| 7,616,329 B2 | 11/2009 | Villar et al. | |
| 7,659,972 B2 | 2/2010 | Magnus et al. | |
| 7,755,660 B2 | 7/2010 | Nejikovsky et al. | |
| 7,772,539 B2 | 8/2010 | Kumar | |
| 7,965,312 B2 | 6/2011 | Chung et al. | |
| 8,345,948 B2 | 1/2013 | Zarembski et al. | |
| 8,412,393 B2 | 4/2013 | Anderson et al. | |
| 8,934,007 B2 | 1/2015 | Snead | |
| 8,942,426 B2 | 1/2015 | Bar-Am | |
| 9,036,025 B2 | 5/2015 | Haas et al. | |
| 9,049,433 B1 | 6/2015 | Prince | |
| 9,050,984 B2 | 6/2015 | Li et al. | |
| 9,083,861 B2 | 7/2015 | Haas et al. | |
| 9,205,850 B2 | 12/2015 | Shimada et al. | |
| 9,240,034 B2 * | 1/2016 | Zhang | G06T 5/00 |
| 2002/0154213 A1 | 10/2002 | Sibyama et al. | |
| 2003/0222981 A1 | 12/2003 | Kisak et al. | |
| 2004/0095585 A1 | 5/2004 | Nayebi | |
| 2007/0217670 A1 | 9/2007 | Bar-Am | |
| 2008/0252789 A1 * | 10/2008 | Sawa | H04N 19/86 348/607 |
| 2009/0037039 A1 * | 2/2009 | Yu | B61L 25/025 701/19 |
| 2009/0102638 A1 | 4/2009 | Olsen et al. | |
| 2009/0196486 A1 | 8/2009 | Distante et al. | |
| 2009/0257620 A1 | 10/2009 | Hicks | |
| 2009/0309976 A1 | 12/2009 | Kumar | |
| 2010/0007551 A1 | 1/2010 | Pagliuco et al. | |
| 2010/0026551 A1 | 2/2010 | Szwilski et al. | |
| 2010/0063657 A1 | 3/2010 | Kumar | |
| 2010/0070172 A1 | 3/2010 | Kumar | |
| 2010/0131185 A1 | 5/2010 | Morris et al. | |
| 2012/0158238 A1 | 6/2012 | Daley et al. | |
| 2012/0300060 A1 | 11/2012 | Farritor | |
| 2013/0060520 A1 | 3/2013 | Amor et al. | |
| 2013/0230212 A1 | 9/2013 | Landes et al. | |
| 2013/0261856 A1 | 10/2013 | Sharma et al. | |
| 2014/0142868 A1 | 5/2014 | Bidaud | |
| 2014/0152814 A1 | 6/2014 | Farritor | |
| 2014/0176711 A1 | 6/2014 | Kirchner et al. | |
| 2014/0200830 A1 | 7/2014 | Bhattacharjya et al. | |
| 2016/0009300 A1 | 1/2016 | Cooper et al. | |
| 2016/0221592 A1 * | 8/2016 | Puttagunta | B61L 23/34 |
| 2017/0089692 A1 * | 3/2017 | Chattopadhyay | H04W 4/70 |

* cited by examiner

MACHINE VISION BASED TRACK-OCCUPANCY AND MOVEMENT VALIDATION

BACKGROUND OF THE INVENTION

Field of the Invention

This invention relates to a train monitoring system and, in particular, a train monitoring system for determining and validating track occupancy and upcoming direction of movement of a rail vehicle.

Description of Related Art

Rail vehicle control systems are used to facilitate the operations of rail vehicles by allowing multiple rail vehicles to operate within a track system while still ensuring that adequate separation exists between each of the rail vehicles on the track system. It is common for track systems to have parallel or adjacent tracks placed close to one another, for example, having a center-to-center distance of approximately fourteen feet between sets of parallel or adjacent tracks. Further, parallel or adjacent tracks often include numerous cross over switches to permit rail vehicles to navigate between parallel or adjacent tracks. These parallel or adjacent tracks increase the difficulty of ensuring adequate separation between each rail vehicle moving through a track system.

To solve this problem, several methods have been employed which include the use of global positioning sensor (GPS) receivers, track circuits, and inertial navigation sensors. However, each of these methods include significant drawbacks.

Additionally, several methods have been employed to detect the presence of occupied tracks and parallel or adjacent tracks disposed on either side of the occupied track using an automatic train control system. However, these solutions do not provide for using static image data based on an image sensor to determine an upcoming direction of movement of the locomotive. Further, these solutions provide no validation of detected track occupancy, as an additional safety feature, and provide no validation of an upcoming direction of movement from the static image data using time series data.

SUMMARY OF THE INVENTION

According to one preferred and non-limiting embodiment or aspect of the present invention, a train monitoring system includes an image sensor disposed on a rail vehicle. The image sensor is positioned to sense an area in front of the rail vehicle and generates sensor signals. At least one non-transitory computer-readable medium includes program instructions that, when executed by at least one processor in communication with the image sensor, cause the at least one processor to: (a) generate static image data based, at least in part, on the sensor signals, the static image data comprising a line representation of rails located in the area in front of the rail vehicle; (b) determine a track occupancy of the rail vehicle by determining a set of rails occupied by the rail vehicle based, at least in part, on the static image data; and (c) determine an upcoming direction of movement of the rail vehicle by determining a direction of the set of rails occupied by the rail vehicle based, at least in part, on the static image data.

The program instructions may cause the at least one processor to validate the determined track occupancy of the rail vehicle based, at least in part, on the upcoming direction of movement of the rail vehicle. The program instructions may cause the at least one processor to validate the determined track occupancy of the rail vehicle and the determined upcoming direction of movement of the rail vehicle based, at least in part, on time series data, time series data including data from the sensor signals obtained at two or more different times.

Determining the track occupancy of the rail vehicle may include determining a number of sets of rails located in the area in front of the rail vehicle. The image sensor may be a monochrome camera, an RGB camera without depth perception, or a depth-sensing camera. An on-board computer system in communication with the image sensor may include the at least one processor and be configured to perform steps (a)-(c). The at least one processor may include a microprocessor dedicated solely to processing sensor data from the image sensor.

Generating the static image data may include filtering the sensor signals with a low pass filter to smoothen an instantaneous image of the area in front of the rail vehicle. Generating the static image data may include generating an enhanced smoothened image to exaggerate pixels of the smoothened image that belong to substantially tubular structures in the area in front of the rail vehicle. Generating the static image data may include determining the two largest components in the enhanced smoothened image in each quantified angular direction category. Generating the static image data may include quantifying lines corresponding to detected connected-component regions representing the rails in front of the rail vehicle in each quantified angular direction category. Generating the static image data may include separating lines representing rails into categories based, at least in part, on relative slopes of the rails.

Determining the upcoming direction of movement of the rail vehicle may include determining an upcoming angular direction of the set of rails occupied by the rail vehicle. An event data recorder in communication with the at least one processor may be configured to store information from the sensor signals. The program instructions may cause the processor to detect obstacles along the rails based, at least in part, on the sensor signals from the image sensor. The program instructions may cause the processor to evaluate a condition of the rails based, at least in part, on the sensor signals from the image sensor.

According to another preferred and non-limiting embodiment or aspect of the present invention, a method of monitoring a train includes: (a) sensing an area in front of a rail vehicle using an image sensor, the image sensor generating sensor signals; (b) generating static image data based, at least in part, on the sensor signals with at least one processor in communication with the image sensor, where the static image data includes a line representation of rails located in the area in front of the rail vehicle; (c) determining, with the at least one processor, track occupancy of the rail vehicle by determining a set of rails occupied by the rail vehicle based, at least in part, on the static image data; and (d) determining, with the at least one processor, an upcoming direction of movement of the rail vehicle by determining a direction of the set of rails occupied by the rail vehicle based, at least in part, on the static image data.

The method may further include validating, with the at least one processor, the determined track occupancy of the rail vehicle based, at least in part, on the upcoming direction of movement of the rail vehicle. The method may further include validating, with the at least one processor, the determined track occupancy of the rail vehicle and the determined upcoming direction of movement of the rail vehicle based, at least in part, on time series data, where the time series data includes data from the sensor signals obtained at two or more different times. Determining the track occupancy of the rail vehicle may include determining a number of sets of rails located in the area in front of the rail vehicle.

Generating the static image data may include filtering the sensor signals with a low pass image filter to smoothen an instantaneous image of the area in front of the rail vehicle. Generating the static image data may include generating an enhanced smoothened image to exaggerate pixels of the smoothened image that belong to substantially tubular structures in the area in front of the rail vehicle. Generating the static image data may include determining the two largest components in the enhanced smoothened image in each quantified angular direction category. Generating the static image data may include quantifying lines corresponding to detected connected-component regions representing the rails in front of the rail vehicle in each quantified angular direction category. Generating the static image data may include separating lines representing rails into categories based, at least in part, on relative slopes of the rails. Determining the upcoming direction of movement of the rail vehicle may include determining an upcoming angular direction of the set of rails occupied by the rail vehicle. An event data recorder in communication with the at least one processor, may be configured to store information from the sensor signals. The at least one processor may be configured to detect obstacles along the rails based, at least in part, on the sensor signals from the image sensor. The at least one processor may be configured to evaluate a condition of the rails based, at least in part, on the sensor signals from the image sensor.

According to another preferred and non-limiting embodiment or aspect of the present invention, a computer program product includes at least one non-transitory computer-readable medium including program instructions that, when executed by at least one computer including at least one processor, causes the computer to: (a) generate static image data based, at least in part, on sensor signals generated from an image sensor in communication with the at least one processor, where the image sensor may be disposed on a rail vehicle and positioned to sense an area in front of the rail vehicle, and the static image data includes a line representation of rails located in the area in front of the rail vehicle; (b) determine track occupancy of the rail vehicle by determining a set of rails occupied by the rail vehicle based, at least in part, on the static image data; and (c) determine an upcoming direction of movement of the rail vehicle by determining a direction of the set of rails occupied by the rail vehicle based, at least in part, on the static image data.

The program instructions may cause the computer to validate the determined track occupancy of the rail vehicle based, at least in part, on the upcoming direction of movement of the rail vehicle. The program instructions may cause the computer to validate the determined track occupancy of the rail vehicle and the determined upcoming direction of movement of the rail vehicle based, at least in part, on time series data. The time series data may include data from the sensor signals obtained at two or more different times. Determining the track occupancy of the rail vehicle may include determining a number of sets of rails located in the area in front of the rail vehicle. Determining the upcoming direction of movement of the rail vehicle may include determining an upcoming angular direction of the set of rails occupied by the rail vehicle.

Further embodiments or aspects will now be described in the following numbered clauses.

Clause 1: A train monitoring system comprising:
an image sensor disposed on a rail vehicle and positioned to sense an area in front of the rail vehicle, the image sensor generating sensor signals; and
at least one non-transitory computer-readable medium comprising program instructions that, when executed by at least one processor in communication with the image sensor, cause the at least one processor to:
(a) generate static image data based, at least in part, on the sensor signals, the static image data comprising a line representation of rails located in the area in front of the rail vehicle;
(b) determine a track occupancy of the rail vehicle by determining a set of rails occupied by the rail vehicle based, at least in part, on the static image data; and
(c) determine an upcoming direction of movement of the rail vehicle by determining a direction of the set of rails occupied by the rail vehicle based, at least in part, on the static image data.

Clause 2: The train monitoring system of clause 1, wherein the program instructions, when executed by the at least one processor, further cause the at least one processor to validate the determined track occupancy of the rail vehicle based, at least in part, on the upcoming direction of movement of the rail vehicle.

Clause 3: The train monitoring system of clause 1 or 2, wherein the program instructions, when executed by the at least one processor, further cause the at least one processor to validate the determined track occupancy of the rail vehicle and the determined upcoming direction of movement of the rail vehicle based, at least in part, on time series data, wherein the time series data comprises data from the sensor signals obtained at two or more different times.

Clause 4: The train monitoring system of any of clauses 1-3, wherein determining the track occupancy of the rail vehicle further comprises determining a number of sets of rails located in the area in front of the rail vehicle.

Clause 5: The train monitoring system of any of clauses 1-4, wherein the image sensor is a monochrome camera, an RGB camera without depth perception, or a depth-sensing camera.

Clause 6: The train monitoring system of any of clauses 1-5, further comprising an on-board computer system in communication with the image sensor, the on-board computer system comprising the at least one processor configured to perform steps (a)-(c).

Clause 7: The train monitoring system of any of clauses 1-6, wherein the at least one processor comprises a microprocessor dedicated solely to processing sensor data from the image sensor.

Clause 8: The train monitoring system of any of clauses 1-7, wherein generating the static image data comprises filtering the sensor signals with a low pass filter to smoothen an instantaneous image of the area in front of the rail vehicle.

Clause 9: The train monitoring system of clause 8, wherein generating the static image data comprises generating an enhanced smoothened image to exaggerate pixels of the smoothened image that belong to substantially tubular structures in the area in front of the rail vehicle.

Clause 10: The train monitoring system of clause 9, wherein generating the static image data comprises determining the two largest components in the enhanced smoothened image in each quantified angular direction category.

Clause 11: The train monitoring system of clause 10, wherein generating the static image data comprises quantifying lines corresponding to detected connected-component regions representing the rails in front of the rail vehicle in each quantified angular direction category.

Clause 12: The train monitoring system of clause 11, wherein generating the static image data comprises separating lines representing rails into categories based, at least in part, on relative slopes of the rails.

Clause 13: The train monitoring system of any of clauses 1-12, wherein determining the upcoming direction of movement of the rail vehicle comprises determining an upcoming angular direction of the set of rails occupied by the rail vehicle.

Clause 14: The train monitoring system of any of clauses 1-13, further comprising an event data recorder in communication with the at least one processor, the event data recorder configured to store information from the sensor signals.

Clause 15: The train monitoring system of any of clauses 1-14, wherein the program instructions cause the processor to detect obstacles along the rails based, at least in part, on the sensor signals from the image sensor.

Clause 16: The train monitoring system of any of clauses 1-15, wherein the program instructions cause the processor to evaluate a condition of the rails based, at least in part, on the sensor signals from the image sensor.

Clause 17: A method of monitoring a train comprising:
sensing an area in front of a rail vehicle using an image sensor, the image sensor generating sensor signals;
generating static image data based, at least in part, on the sensor signals with at least one processor in communication with the image sensor, wherein the static image data comprises a line representation of rails located in the area in front of the rail vehicle;
determining, with the at least one processor, track occupancy of the rail vehicle by determining a set of rails occupied by the rail vehicle based, at least in part, on the static image data; and
determining, with the at least one processor, an upcoming direction of movement of the rail vehicle by determining a direction of the set of rails occupied by the rail vehicle based, at least in part, on the static image data.

Clause 18: The method of clause 17, further comprising: validating, with the at least one processor, the determined track occupancy of the rail vehicle based, at least in part, on the upcoming direction of movement of the rail vehicle.

Clause 19: The method of clause 17 or 18, further comprising: validating, with the at least one processor, the determined track occupancy of the rail vehicle and the determined upcoming direction of movement of the rail vehicle based, at least in part, on time series data, wherein the time series data comprises data from the sensor signals obtained at two or more different times.

Clause 20: The method of any of clauses 17-19, further comprising: determining the track occupancy of the rail vehicle further comprises determining a number of sets of rails located in the area in front of the rail vehicle.

Clause 21: The method of any of clauses 17-20, wherein generating the static image data comprises filtering the sensor signals with a low pass image filter to smoothen an instantaneous image of the area in front of the rail vehicle.

Clause 22: The method of clause 21, wherein generating the static image data comprises generating an enhanced smoothened image to exaggerate pixels of the smoothened image that belong to substantially tubular structures in the area in front of the rail vehicle.

Clause 23: The method of clause 22, wherein generating the static image data comprises determining the two largest components in the enhanced smoothened image in each quantified angular direction category.

Clause 24: The method of clause 23, wherein generating the static image data comprises quantifying lines corresponding to detected connected-component regions representing the rails in front of the rail vehicle in each quantified angular direction category.

Clause 25: The method of clause 24, wherein generating the static image data comprises separating lines representing rails into categories based, at least in part, on relative slopes of the rails.

Clause 26: The method of any of clauses 17-25, wherein determining the upcoming direction of movement of the rail vehicle comprises determining an upcoming angular direction of the set of rails occupied by the rail vehicle.

Clause 27: The method of any of clauses 17-26, wherein an event data recorder is in communication with the at least one processor, the event data recorder configured to store information from the sensor signals.

Clause 28: The method of any of clauses 17-27, wherein the at least one processor is configured to detect obstacles along the rails based, at least in part, on the sensor signals from the image sensor.

Clause 29: The method of any of clauses 17-28, wherein the at least one processor is configured to evaluate a condition of the rails based, at least in part, on the sensor signals from the image sensor.

Clause 30: A computer program product comprising at least one non-transitory computer-readable medium including program instructions that, when executed by at least one computer including at least one processor, causes the computer to:
generate static image data based, at least in part, on sensor signals generated from an image sensor in communication with the at least one processor, wherein the image sensor is disposed on a rail vehicle and positioned to sense an area in front of the rail vehicle, wherein the static image data comprises a line representation of rails located in the area in front of the rail vehicle;
determine track occupancy of the rail vehicle by determining a set of rails occupied by the rail vehicle based, at least in part, on the static image data; and
determine an upcoming direction of movement of the rail vehicle by determining a direction of the set of rails occupied by the rail vehicle based, at least in part, on the static image data.

Clause 31: The computer program product of clause 30, wherein the program instructions cause the computer to validate the determined track occupancy of the rail vehicle based, at least in part, on the upcoming direction of movement of the rail vehicle.

Clause 32: The computer program product of clause 30 or 31, wherein the program instructions cause the computer to validate the determined track occupancy of the rail vehicle and the determined upcoming direction of movement of the rail vehicle based, at least in part, on time series data, wherein the time series data comprises data from the sensor signals obtained at two or more different times.

Clause 33: The computer program product of any of clauses 30-32, wherein determining the track occupancy of the rail vehicle further comprises determining a number of sets of rails located in the area in front of the rail vehicle.

Clause 34: The computer program product of any of clauses 30-33, wherein determining the upcoming direction of movement of the rail vehicle comprises determining an upcoming angular direction of the set of rails occupied by the rail vehicle.

These and other features and characteristics of the present invention, as well as the methods of operation and functions of the related elements of the structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
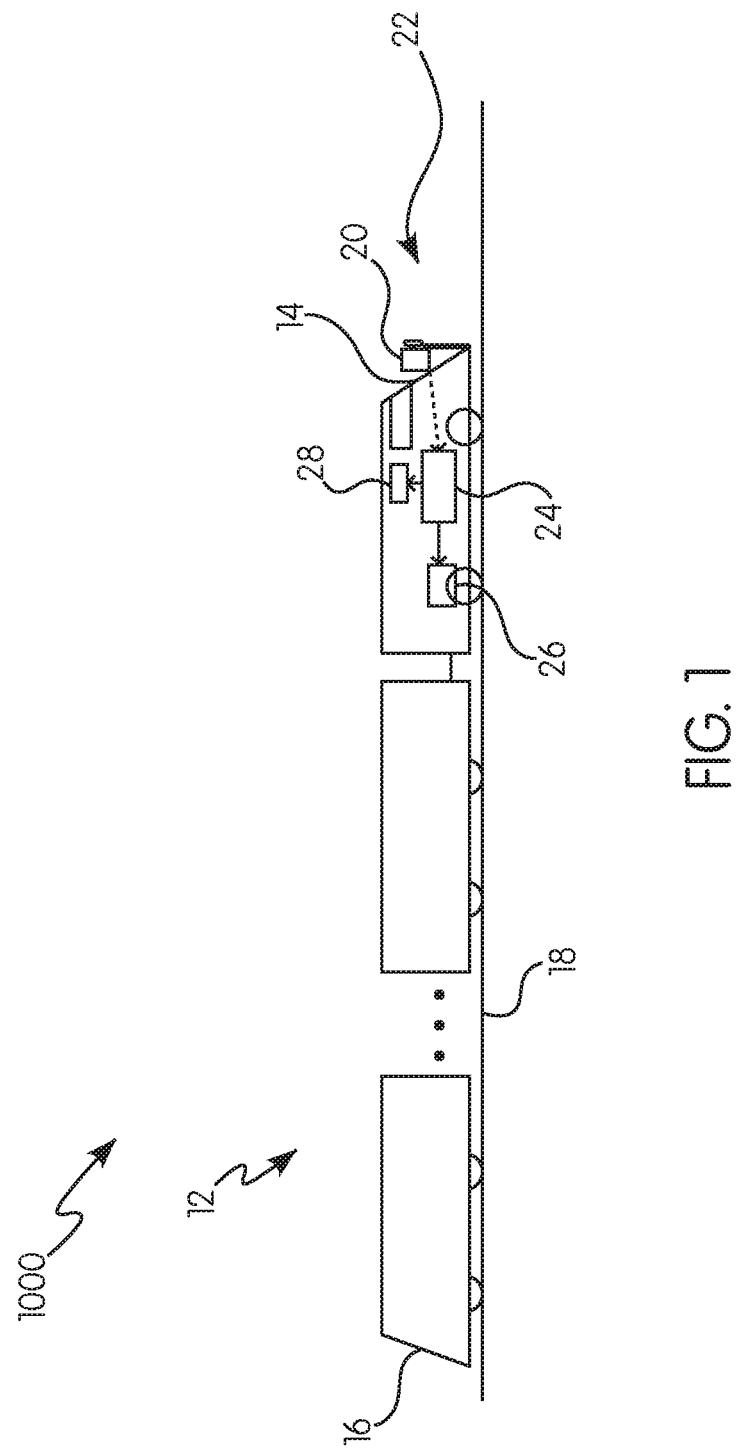
FIG. 1 is a schematic diagram of one embodiment of a train monitoring system according to the principles of the present invention.

For the purposes of the description, hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other types of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc. between the first and second unit or device. For example, the first unit may be in communication with a second unit if an intermediary unit processes data from one unit and transmits processed data to the second unit. It will be appreciated that numerous arrangements are possible. Any known electronic communication protocol and/or algorithms may be used, such as, for example, TCP/IP (including HTTP and other protocols), WLAN (including 802.11 and other radio frequency-based protocols and methods), analog transmissions, Global System for Mobile Communications (GSM), and/or the like.

Referring to FIG. 1, a train monitoring system 1000 is shown according to one preferred and non-limiting embodiment or aspect. A rail vehicle 12 may include a front 14 (e.g., a locomotive) and a rear 16 (e.g., a caboose or a last rail car), and the rail vehicle 12 may run along a track 18. An image sensor 20 in communication with at least one or more processors 24 may be disposed on the front 14 of the rail vehicle 12 and positioned so as to sense an area 22 in front 14 of the rail vehicle 12. In a non-limiting embodiment or aspect, the processor 24 may be an on-board computer system. In other non-limiting embodiments or aspects, the processor 24 may include a microprocessor dedicated solely for use with the image sensor 20 or a microprocessor that is also used for other purposes. An event data recorder 26 may also be provided, and the event data recorder 26 may be in communication with the processor 24. An on-board display 28 in communication with the processor 24 may also be included to display information sent to the on-board display 28 from the processor 24. The on-board display 28 may display information in a human-readable form, such as useful text or pictures.

In a preferred and non-limiting embodiment or aspect, the image sensor 20 is a camera, such as a video camera. The image sensor 20 may be a monochrome camera or an RGB camera without depth perception. The image sensor 20 may also be a depth-sensing camera, such as an RGB-D camera. The image sensor 20 may be disposed on the front 14 of the rail vehicle 12 as shown in FIG. 1. For example, the image sensor 20 may be positioned on the front 14 of the rail vehicle 12 to sense the desired area 22 in front 14 of the rail vehicle 12. For instance, the image sensor 20 may be positioned higher up (vertically) on the front 14 of the rail vehicle 12 if the desired area 22 to be sensed is farther ahead of the rail vehicle 12 than an area immediately in the front 14 of the rail vehicle 12. However, the image sensor 20 may sense an area 22 less distant from the front 14 of the rail vehicle 12, such as sensing portions of the tracks 18 closest to the front 14 of the rail vehicle 12. In this scenario, the image sensor 20 may be positioned lower on the front 14 of the rail vehicle 12. The image sensor 20 may also be positioned where desired horizontally on the front 14 of the rail vehicle 12 in order to sense the desired area 22 in front 14 of the rail vehicle 12. In a preferred and non-limiting embodiment or aspect, the image sensor 20 may be positioned centered (horizontally) on the front 14 of the rail vehicle 12. However, it is contemplated that the image sensor 20 may be positioned off-centered (horizontally) to sense the desired area 22 in front 14 of the rail vehicle 12, or may be positioned anywhere else such that a portion of the tracks 18 in front 14 of the rail vehicle 12 can be sensed.

Figure 2:
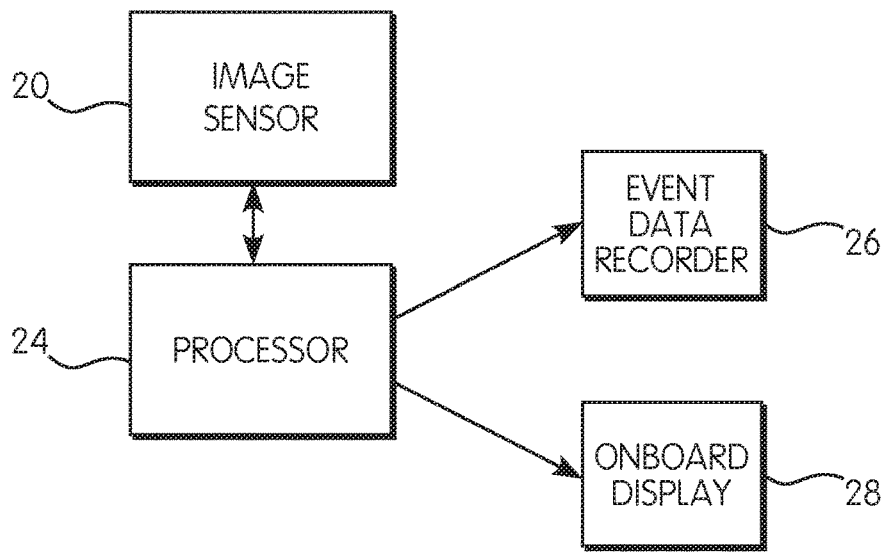
FIG. 2 is a schematic diagram of communication between at least one processor and other components of a train monitoring system according to the principles of the invention.

Referring to FIGS. 1 and 2, in a preferred and non-limiting embodiment or aspect, the image sensor 20 senses the area 22 in front 14 of the rail vehicle 12 and generates sensor signals based, at least in part, on the image sensed. The image sensor 20 may send sensor signals to the processor 24. It is also contemplated that the processor 24 may send information to the image sensor 20. For instance, the processor 24 may send information to the image sensor 20 in the form of commands so that the image sensor 20 collects the relevant information regarding the area 22 in front 14 of the rail vehicle 12.

With continued reference to FIGS. 1 and 2, in a preferred and non-limiting embodiment or aspect, the processor 24 may be in communication with the event data recorder 26. The processor 24 may store at least a portion of the information it receives, from the image sensor 20 or elsewhere, or at least a portion of the information generated by the processor 24, with the event data recorder 26. In a non-limiting example, the processor 24 may receive image data from the image sensor 20 in the form of sensor signals, and the processor 24 may, in turn, write at least a portion of that image data to memory within the event data recorder 26. The information stored on the event data recorder 26 may later be reviewed and interpreted, as needed.

Still referring to FIGS. 1 and 2, in a preferred and non-limiting embodiment or aspect, the processor 24 may be in communication with the on-board display 28. The processor 24 may communicate with an on-board display 28 in order to cause the on-board display 28 to display at least a portion of the information received or generated by the processor 24. The information displayed on the on-board display 28 may be in the form of human-readable text or images. By way of example, the image sensor 20 may sense an image of the area 22 in front 14 of the rail vehicle 12 and send the generated sensor signals associated with that image to the processor 24. The processor 24 may then send that information to the on-board display 28 so that the sensed image may be displayed on the on-board display 28.

Figure 5A:
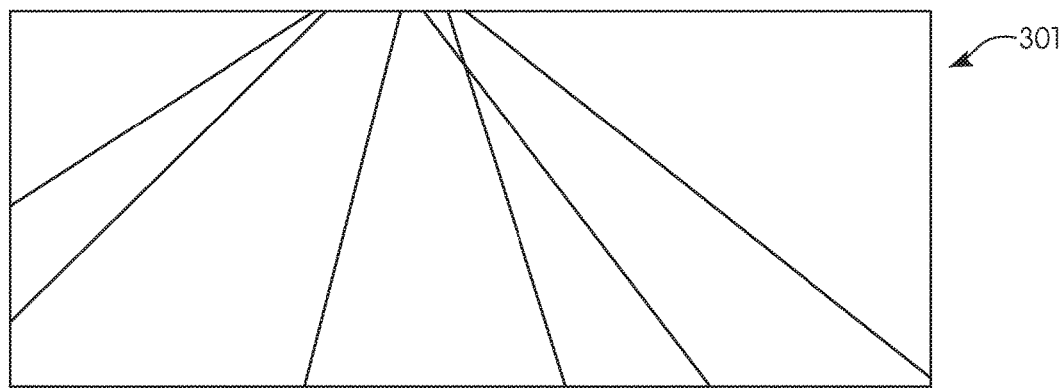
FIGS. 5A-5C show embodiments of static image data generated by a train monitoring system corresponding to the sensed images from FIGS. 4A-4C, respectively, according to principles of the present invention.
Figure 5B:
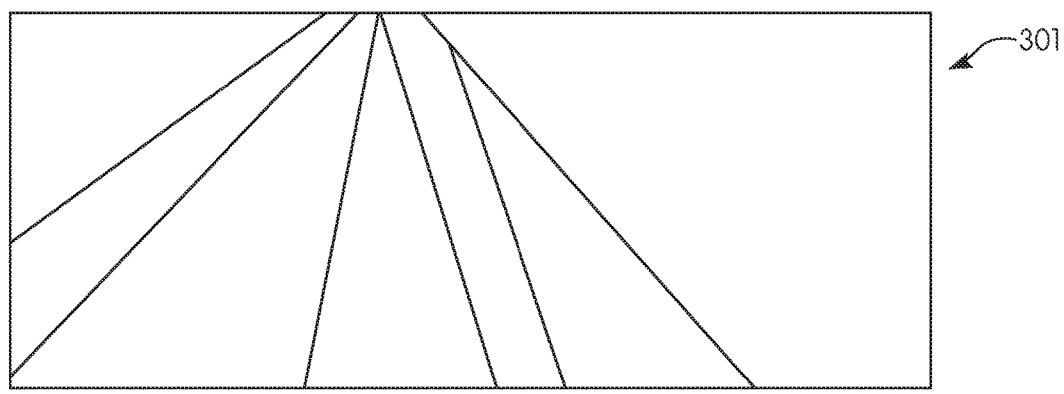
Figure 5C:
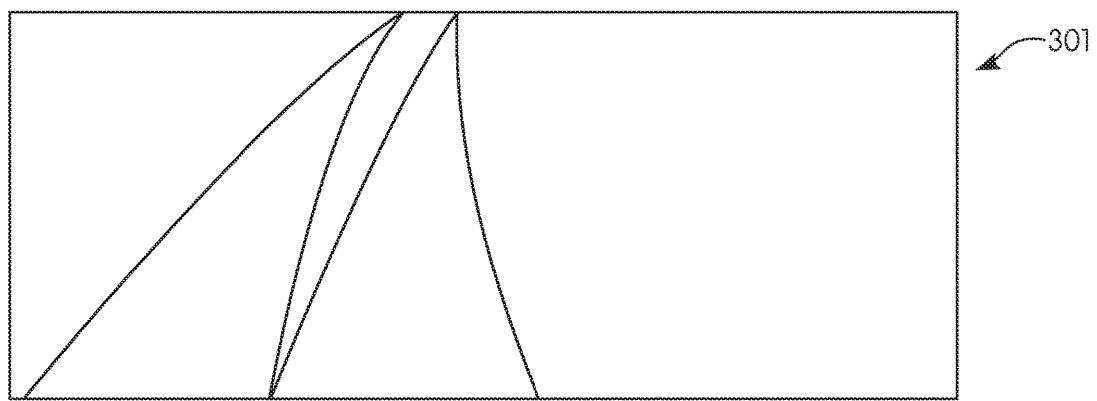

In a preferred and non-limiting embodiment or aspect, the processor 24 may automatically generate static image data based partially on the sensor signals received from the image sensor 20. The static image data may be information generated, based partially on a single image taken by the image sensor 20. In one example, the static image data generated by the processor 24 corresponds to an image taken by the image sensor 20 at a specific time ($t_r$). The static image data generated by the processor 24 may be in any useful form for the processor 24 to use in order to perform other functions. In one preferred and non-limiting embodiment or aspect, the static image data may be in the form of a line representation of rails located in the area 22 in front 14 of the rail vehicle 12. An example of line representations of rails is shown in FIGS. 5A-5C, which are explained in more detail hereinafter. The static image data may, in some non-limiting embodiments or aspects, be generated in a human-readable form. For instance, the processor 24 may cause the on-board display 28 to display the line representation after the processor 24 has generated the same. However, in other non-limiting embodiments or aspects, the static image data may be generated in a non-human-readable form and a form useable by the processor 24 to perform other functions.

The line representation of the rails, previously described, may be generated exclusively from the sensor signals sent from the image sensor 20, in a preferred and non-limiting embodiment or aspect. The line representation of the rails may be generated using an algorithm that may include a multi-step image processing pipeline. In order to generate the line representation of the rails, the processor 24 may automatically, after receiving sensor signals from the image sensor 20, utilize a low-pass image filter to smoothen the instantaneous image taken by the image sensor 20. The processor 24 may then automatically utilize an image enhancement algorithm to exaggerate pixels of the smoothened image belonging to substantially tubular structures in the smoothened image to generate an enhanced smoothened image. The processor 24 utilizes image enhancement to exaggerate pixels of the smoothened image belonging to substantially tubular structures because these substantially tubular structures may correspond to rails in the area 22 in front 14 of the rail vehicle 12. The processor 24 may then automatically utilize a connected-component thresholding algorithm to identify the two largest components in the enhanced smoothened image in each angular direction category quantified by the image enhancement algorithm. The processor 24 may then automatically utilize a Hough transform line detection algorithm to quantify lines corresponding to detected connected-component regions representing the rails in front 14 of the rail vehicle 12 in each angular direction category quantified by the image enhancement algorithm. The processor 24 may then separate lines representing sets of parallel or adjacent tracks 18 into categories based partially on the relative slopes of the rails as determined by the Hough transform.

In a preferred and non-limiting embodiment or aspect, the processor 24 may automatically determine track occupancy based partially on the generated static image data and, ultimately, on the sensor signals from the image sensor 20 used by the processor 24 to generate the static image data. In some non-limiting embodiments or aspects, the determined track occupancy may be determined based exclusively on the static image data. As previously discussed, it is common for multiple train tracks 18 to run parallel, substantially parallel, or adjacent to one another, meaning that an instantaneous image sensed by the image sensor 20 may include multiple sets of rails. The processor 24, using the static image data, may automatically determine, based solely on the static image data, which of the sets of rails in the image sensed by the image sensor 20 the rail vehicle 12 occupies. In a non-limiting embodiment or aspect, the determination of track occupancy by the processor 24 may be made based on all of the slopes of the rails detected in the line representation of the rails for an instantaneous image. The processor 24 may then send its determination of track occupancy to the on-board display 28 to display the determined track occupancy.

In a preferred and non-limiting embodiment or aspect, the processor 24 may automatically determine an upcoming direction of movement based partially on the generated static image data and, ultimately, on the sensor signals from the image sensor 20 used by the processor 24 to generate the static image data. In some non-limiting embodiments or aspects, the upcoming direction of movement may be determined based exclusively on the static image data. The image sensed by the image sensor 20 captures the area 22 (including tracks 18) in front 14 of the rail vehicle 12. The processor 24 may use an instantaneous image of the tracks 18 in front 14 of the rail vehicle 12 to determine the direction the rail vehicle 12 is about to follow (i.e., the upcoming direction of movement of the rail vehicle 12). The processor 24 may determine the upcoming direction of movement of the rail vehicle 12 using rule-based reporting of the trajectory of the rail vehicle 12 based partially on parameters quantified by the processor 24 to form the static image data (such as the line representation of the rails). In a non-limiting embodiment or aspect, the upcoming direction of movement may be determined based partially on the slopes of the rails in the line representation of the rails. For instance, the processor 24 may base the determination on the convergence of the rails in the line representation of the rails. If the rails in the line representation of the rails are converging going straight, the processor 24 may determine that the rail vehicle 12 is traveling straight. If the convergence of the rails is less than in the situation where the rail vehicle 12 is traveling straight and the slope of the rails is negative (i.e., leaning left), the processor 24 may determine that the rail vehicle 12 is turning left. If the convergence of the rails is less than in the situation where the rail vehicle 12 is traveling straight and the slope of the rails is positive (i.e., leaning right), the processor 24 may determine that the rail vehicle 12 is turning right. In a preferred and non-limiting embodiment or aspect, the processor may also determine the angular direction (e.g., in degrees) of the upcoming direction of movement of the rail vehicle 12 in addition to providing the direction (e.g., left, straight, or right). For instance, the processor 24 may determine that the upcoming direction of the rail vehicle 12 is bearing left 30°. The information regarding the upcoming direction of movement may be displayed on the on-board display 28.

In a preferred and non-limiting embodiment or aspect, after the processor 24 determines a track occupancy and determines the upcoming direction of movement, the processor 24 may automatically validate the determined track occupancy based partially on the determined upcoming direction of movement. This determination provides an extra level of certainty to the determined track occupancy by requiring the determined upcoming direction of movement validate the determined track occupancy.

In a preferred and non-limiting embodiment or aspect, after the processor 24 determines the track occupancy and determines the upcoming direction of movement, the processor 24 may automatically validate the determined track occupancy and the determined upcoming direction of movement based partially on time series data. Time series data may include data from the image sensor 20 taken at two or more distinct time periods (e.g., $t_1$ and $t_2$). In some non-limiting embodiments or aspects, the distinct time periods are temporally proximate. By way of example, the time series data may be a plurality of instantaneous images taken by the image sensor 20 fractions of a second apart. In a non-limiting embodiment or aspect, it may be preferable that the length of time between the data points taken by the image sensor 20 be short so that the collection of instantaneous images capture a specified section of track 18 in front 14 of the rail vehicle 12 in a plurality of instantaneous images. After the processor 24 receives sensor signals obtained by the image sensor 20 from at least two distinct time periods (time series data), the processor 24 may automatically validate the determined track occupancy and the determined upcoming direction of movement (both calculated using static image data) based partially on the time series data. The time series data may help provide a more accurate picture of the track occupancy and upcoming direction of movement of the rail vehicle 12 because the time series data considers a plurality of instantaneous images, as opposed to image data from a single time period (a single instantaneous image). In one non-limiting embodiment or aspect, the processor 24 may use the change in slope of the detected rails over the change in time from the time series data to determine the track occupancy and the upcoming direction of movement of the rail vehicle 12. This determination of track occupancy and the upcoming direction of movement based on time series data may then be automatically compared to the track occupancy and upcoming direction of movement determined using the static image data to validate the determinations of track occupancy and upcoming direction of movement based on static image data.

In a preferred and non-limiting embodiment or aspect, the processor 24 may automatically determine the number of sets of parallel or adjacent tracks 18 based partially on the information received from the image sensor 20. It is noted that each set of parallel or adjacent tracks 18 will be comprised of at least two of the detected rails (i.e., a pair of rails that make up a set of tracks 18). Information regarding the number of sets of parallel or adjacent tracks 18 determined by the processor 24 may be displayed on the on-board display 28.

In a preferred and non-limiting embodiment or aspect, the processor 24 may automatically detect obstacles along the rails in the area 22 in front 14 of the rail vehicle 12 captured by the image sensor 20. This determination is made by the processor 24 based partially on the information received from the image sensor 20. In addition, the processor 24 may automatically evaluate a condition of the rails in the area 22 in front 14 of the rail vehicle 12 captured by the image sensor 20. Both the detection of an obstacle and the evaluation of the condition of the rails may be displayed on the on-board display 28 or otherwise communicated in a human-readable form. This data may be used to quantify rail-head wear and tear or broken rails.

It is noted that the numerous, previously-described functions of the processor 24 may be performed by the processor 24 in real-time based on the real-time information relayed to the processor 24 from the image sensor 20.

Figure 3A:
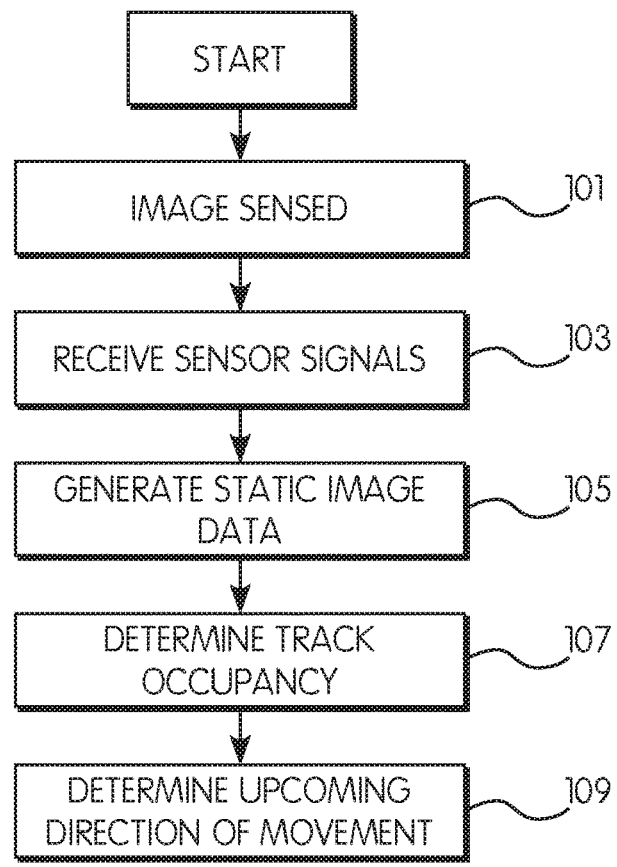
FIGS. 3A-3B are step diagrams for embodiments of a train monitoring system and method according to the principles of the present invention.

Referring to FIG. 3A, an exemplary process performed by the train monitoring system 1000 is shown according to one preferred and non-limiting embodiment or aspect. As previously mentioned, the steps of this process (or any other process in this disclosure) do not necessarily need to be in the order pictured in the figures or explained herein. An image may be sensed at step 101 by the image sensor 20, and the image sensor 20 may generate corresponding sensor signals. The processor 24 may receive these sensor signals at step 103 from the image sensor 20. Based partially on the sensor signals, the processor 24 may automatically generate static image data at step 105 by generating a line representation of the rails present in the sensed image. The processor 24 may determine track occupancy of the rail vehicle 12 at step 107 based partially on the static image data. The processor 24 may also determine an upcoming direction of movement of the rail vehicle 12 at step 109 based partially on the static image data.

Figure 3B:
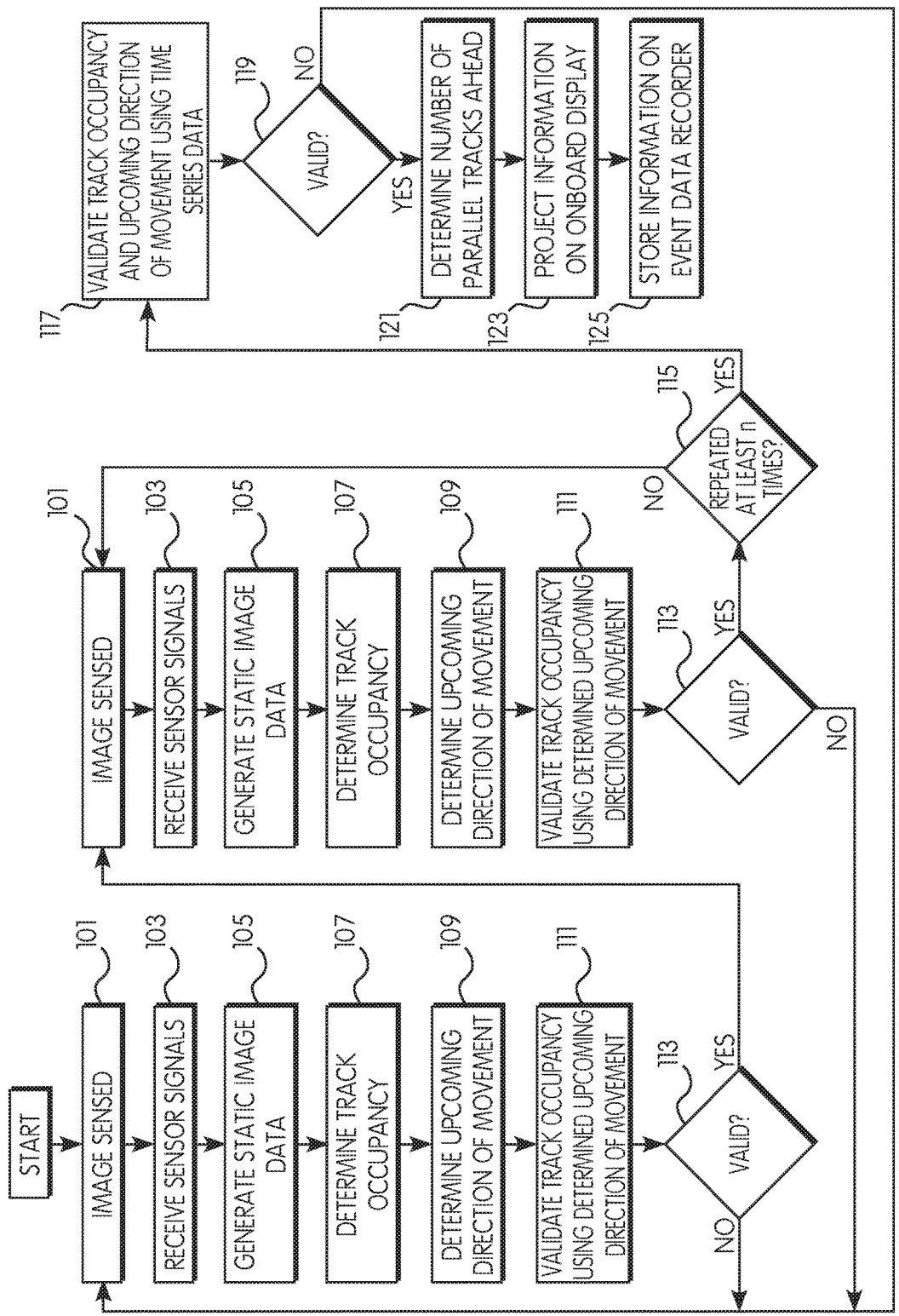

Referring to FIG. 3B, another exemplary process performed by the train monitoring system 1000 is shown according to another preferred and non-limiting embodiment or aspect. The process in FIG. 3B may initially use identical steps to the process in FIG. 3A. The process in FIG. 3B may then include the processor 24 validating the determined track occupancy using the determined upcoming direction of movement at step 111, as an additional check on the train monitoring system 1000. The processor 24 may compare the determined track occupancy and the determined upcoming direction of movement to consider the validity of the determined track occupancy at step 113. If the determined track occupancy is invalid, the process may return to the beginning where an image is sensed at step 101 by the image sensor 20 for the first time. If the determined track occupancy is valid, another, subsequent ($n^{th}$) image may be sensed at step 101 by the image sensor 20. In other words, the image sensed by the image sensor 20 in this step occurs at a later time than the first image sensed. This $n^{th}$ image goes through the identical process of the first image (i.e., processor 24 receiving sensor signals at step 103, processor 24 generating static image data at step 105, processor 24 determining track occupancy at step 107, processor 24 determining upcoming direction of movement at step 109, and processor 24 validating the track occupancy using determined upcoming direction of movement at step 111). The processor 24 may compare the determined track occupancy and the determined upcoming direction of movement for the $n^{th}$ image to consider the validity of the determination of track occupancy at step 113. If the determined track occupancy is invalid, the process may return to the beginning where an image is sensed at step 101 by the image sensor 20 for the first time. If the determined track occupancy is valid, the processor 24 may consider how many images have been sensed (i.e., how many sets of static image data have been taken). If the process has not been repeated enough times at step 115 (i.e., "n" times), another image is sensed at step 101 and the process is repeated until enough images have been sensed to satisfy the "n" times requirement. In some non-limiting embodiments or aspects, "n" may be specified to ensure enough static image data is taken before continuing the process to perform time series data steps. It is noted that "n" must be a number greater than 1. In some instances, only two images are taken before performing the time series data steps. In other instances, more data may be collected before moving to the time series data steps, such as "n" is 10, such as "n" is 50, such as "n" is 100, such as "n" is 200, such as "n" is 500, such as "n" is 1,000, such as "n" is more than 1,000.

With continued reference to FIG. 3B, once enough static image data has been collected, the process may continue by the processor 24 validating determined track occupancy and determined upcoming direction of movement based partially on the time series data at step 117 collected earlier in the process. The processor 24 may determine the validity of the track occupancy and the upcoming direction of movement at step 119, and if the determination made by the processor 24 is that the track occupancy and/or the upcoming direction of movement detected using static image data is invalid based on the time series data, the process returns to the beginning where an image is sensed at step 101 by the image sensor 20 for the first time. If the determination made by the processor 24 is that the track occupancy and/or the upcoming direction of movement detected using static image data is valid based on the time series data, the process may continue. The processor 24 may determine the number of parallel or adjacent tracks 18 ahead at step 121 in the area 22 in front 14 of the rail vehicle 12. A subset of information processed by the processor 24, including information sent to the processor 24 from the image sensor 20, may be displayed at step 123 on the on-board display 28. The processor 24 may also store a subset of the information it processes at step 125, including information sent to the processor 24 from the image sensor, on the event data recorder 26.

Figure 4A:
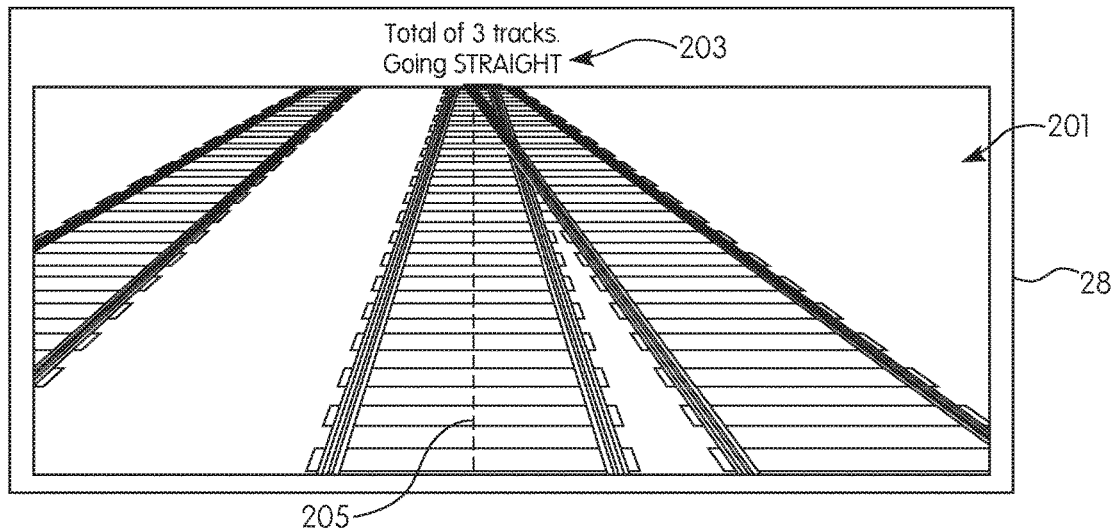
FIGS. 4A-4C show embodiments of on-board displays displaying relevant information from a train monitoring system according to the principles of the present invention.
Figure 4B:
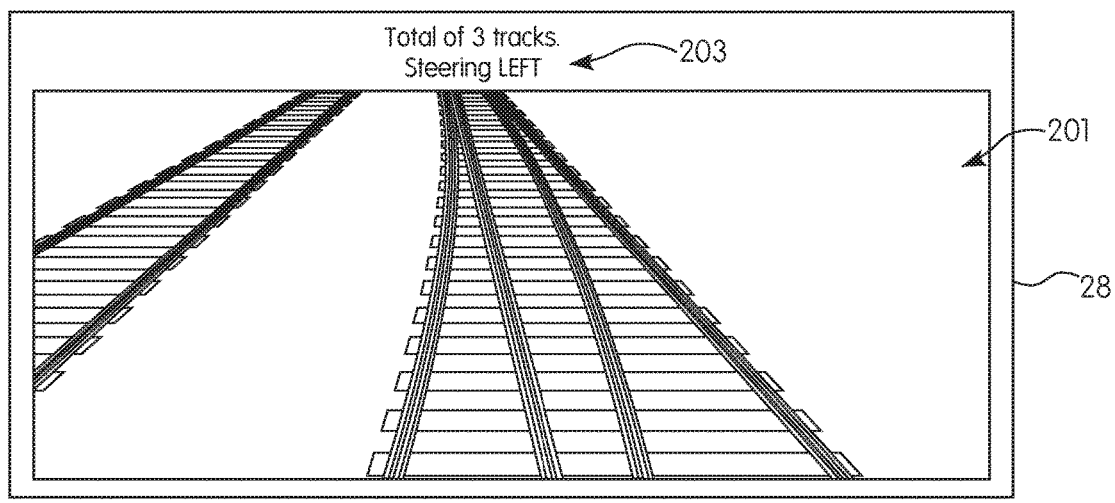
Figure 4C:
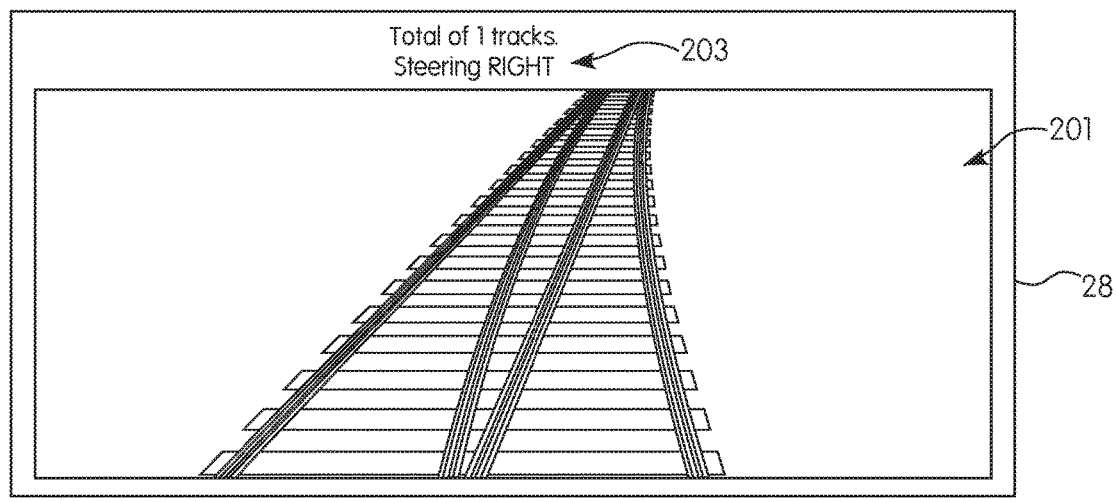

Referring to FIGS. 4A-4C, the on-board display 28 is shown according to a preferred and non-limiting embodiment or aspect. The processor 24 (not shown) may send the information to be displayed on the on-board display 28, including information from the image sensor 20 (not shown). In some non-limiting embodiments or aspects, such as those in FIGS. 4A-4C, a sensed image 201 from the image sensor 20 is displayed on the on-board display 28. In other words, an instantaneous image of the area 22 in front 14 of the rail vehicle 12 sensed by the image sensor 20 is displayed on the on-board display 28. In some non-limiting embodiments or aspects, a real-time video feed from the image sensor 20 of the area 22 in front 14 of the rail vehicle 12 is displayed on the on-board display 28. In some non-limiting embodiments or aspects, such as those in FIGS. 4A-4C, determined information 203 may be displayed on the on-board display 28. Specifically in FIGS. 4A-4C shown, the determined information 203 shown on the on-board display 28 is the total number of parallel or adjacent tracks 18 detected and the upcoming direction of movement. In addition, as shown in FIG. 4A, a track occupancy indicator 205 may be displayed on the on-board display 28 to show the track 18 on which the rail vehicle 12 is traveling. The track occupancy indicator 205 may be a dotted line down the middle of the occupied track, or the track occupancy indicator 205 may be any other symbolic means to indicate the occupied track (e.g., highlighting the occupied track, a star next to the occupied track, text in the determined information 203, etc.). The on-board display 28 is not limited to displaying the information shown in FIGS. 4A-4C and may display any information from the processor 24. For instance, the line representation of rails may be displayed on the on-board display 28, as opposed to the sensed image 201. In other examples, information regarding obstacles on the rails or the evaluated condition of the rails may be displayed on the on-board display 28. In addition, other information unrelated to the information sent from the image sensor 20 to the processor 24 may be displayed on the on-board display 28. A few non-limiting examples of this unrelated information may include weather information, distance traveled information, speed of the rail vehicle 12 information, etc.

Referring to FIGS. 5A-5C, line representations of rails 301 are shown according to one preferred non-limiting embodiment or aspect. The line representation of the rails 301 shown in FIGS. 5A-5C correspond to the sensed images 201 from FIGS. 4A-4C. As may be seen from comparing FIGS. 4A-4C and FIGS. 5A-5C, the line representations of the rails may be simplified representations of the sensed images 201 and may reduce the sensed image 201 to only a clear representation (as lines) of the rails in the area 22 in front 14 of the rail vehicle 12. In other words, in some non-limiting embodiments or aspects, only the rails from the sensed images 201 may appear in the line representation of the rails 301. The rails from the images sensed 201 may be reduced to merely a dark line (i.e., showing no additional details such as transverse boards of the tracks 18, bolts associated with the rails to secure the rails to the ground, etc.). This simplification from the sensed image 201 to the line representation of the rails 301 may be the result of the previously described functions of the processor 24 performed after receiving sensor signals from the image sensor 20. The line representation of the rails 301 may be displayed on the on-board display 28, or it may merely be generated internally by the processor 24 as part of the processor 24 performing other functions.

Example 1

As previously described, the train monitoring system 1000 may determine the track occupancy and upcoming direction of movement of the rail vehicle 12 and validate both. The below described algorithm is a preferred non-limiting example of an algorithm of the train monitoring system 1000 to determine track occupancy and upcoming direction of movement and to validate track occupancy and upcoming direction of movement.

In this example, the rail vehicle 12 includes the image sensor 20 positioned on the front 14 of the rail vehicle 12 so as to view the area 22 in front 14 of the rail vehicle 12, including the track 18 in front 14 of the rail vehicle 12. The image sensor 20 communicates with the processor 24.

As the rail vehicle 12 runs along the track 18, the image sensor 20 senses a first image at initial time $t_o$, and sends the sensed first image, in the form of sensor signals, to the processor 24. Based on the sensor signals from the first image sensed at initial time $t_o$, the processor 24 generates static image data, including a line representation of rails of the area 22 in front 14 of the rail vehicle 12. This static image data is generated by filtering the sensor signals with a low pass filter to smoothen the first image of the area 22 in front 14 of the rail vehicle 12. An enhanced smoothened image is then generated to exaggerate pixels of the smoothened first image that belong to substantially tubular structures in the area 22 in front 14 of the rail vehicle 12. The two largest components of the enhanced smoothened image are then determined in each quantified angular direction category. Lines corresponding to detected connected-component regions representing the rails in front 14 of the rail vehicle 12 in each quantified angular direction category are quantified. The lines representing rails are then separated into categories based in part on relative slopes of the rails.

From the above-described algorithm, the resulting line representation of the rail of the first image is generated. Based on this static image data, including the line representation of the rails, the processor 24 determines the track occupancy of the rail vehicle 12. Based on this static image data, including the line representation of the rails, the processor 24 also determines the upcoming direction of movement of the rail vehicle 12. The processor 24 then validates the determined track occupancy of the rail vehicle 12 based on the determined upcoming direction of movement of the rail vehicle 12.

As the rail vehicle 12 continues to run along the track 18, the image sensor 20 senses a second image to an $n^{th}$ image at times $t_1$ to $t_n$, respectively, which are times occurring after the initial time $t_o$. As each of the second image to the $n^{th}$ image are sensed by the image sensor 20, the image sensor 20 sends the sensed images, in the form of sensor signals, to the processor 24. This information from the first image to the $n^{th}$ image constitutes time series data. Based on this time series data, the processor 24 validates the previously determined track occupancy of the rail vehicle 12 and upcoming direction of movement of the rail vehicle 12.

Based on the first image, or any of the subsequent images, the processor 24 also determines the number of sets of rails located in the area 22 in front 14 of the rail vehicle 12, detects obstacles along the rails, and evaluates the condition of the rails.

Example 2

As previously described, the processor 24, based partially on the sensor signals received from the image sensor 20, may automatically generate static image data. This static image data may be, for instance, line representations of rails. The below describe algorithm is a preferred non-limiting example of an algorithm that the processor 24 may perform to generate a line representation of rails:

A multi-scale Hessian-based vesselness filter may be applied independently to each image frame from the image sensor 20 on the front 14 of the rail vehicle 12, followed by a binary thresholding, connected-component filtering (i.e., to identify the largest connected components in a thresholded image result) in order to preserve railheads detected in any orientation in front of a rail vehicle 12 while eliminating noisy or extraneous detections of line-like or rail-like structures seen in the image frame, and finally application of a Hough transform to the resulting data in order to obtain a quantitative/parametric representation of the rails seen in a given image frame.

A Hessian-based multi-scale filter may be based on the eigenvalues and eigenvectors of the Hessian matrix at each voxel location in the masked greyscale image data. The eigenvalues and eigenvectors have been shown to be closely related to the intensity and direction of vascular structure. The Hessian matrix for a given position in 2D input image I is a 2×2 matrix at every image pixel location, composed of second order derivatives of the input image I:

$$\nabla^2 I = \begin{bmatrix} \frac{\partial^2 I}{\partial^2 x} & \frac{\partial^2 I}{\partial x \partial y} \\ \frac{\partial^2 I}{\partial y \partial x} & \frac{\partial^2 I}{\partial^2 y} \end{bmatrix} \quad (1)$$

In practice, the second order derivatives of I at position (x,y) are calculated using second order derivatives of Gaussian kernel multiplying the square of Gaussian scale, $\sigma^2$, defined in the equations below:

$$\frac{\partial^2 I}{\partial^2 x} = \left(\sigma^2 \times \frac{\partial^2}{\partial^2 x} G(x, y; \sigma)\right) * I(x, y) \quad (2)$$

$$G(x, y; \sigma) = \frac{1}{\sqrt{(2\pi\sigma^2)^2}} \exp\left(-\frac{x^2 + y^2}{2\sigma^2}\right) \quad (3)$$

where, * represents convolution, and G(x,y; σ) is an isotropic 2D Gaussian function with standard deviation, σ.

If the two eigenvalues of $\nabla^2 I$ at a voxel (x,y,z) are $\lambda_1$ and $\lambda_2$, then the relation between eigenvalues and the regional appearance when the given pixel in the image represents a tubular structure is: $|\lambda_1| \ll |\lambda_2|$. Based on knowledge of this relationship between eigenvalues and shape patterns represented by a given pixel in an image, the eigenvalues of the Hessian matrix may be used to evaluate line-like or tubular structures of the images. A response function may be used to detect the vessel structure, where similarity to a line structure may be given by:

$$L = f(\lambda_1; \lambda_2) \times \lambda_2 \quad (4)$$

where, $$(\lambda_1 > \lambda_2), \quad (5)$$

$$f(\lambda_1; \lambda_2) = \begin{cases} \exp\left(-\frac{\lambda_1^2}{2(\alpha_1 \lambda_2)^2}\right) & \lambda_1 \leq 0, \lambda_2 \neq 0 \\ \exp\left(-\frac{\lambda_1^2}{2(\alpha_2 \lambda_2)^2}\right) & \lambda_1 > 0, \lambda_2 \neq 0 \\ 0 & \lambda_2 = 0 \end{cases} \quad (6)$$

L in Equation (5) computes to low value (approaching zero) when the local structure is a blob-like (e.g., amorphous) structure and high value (approaching one) when the local structure is a line-like structure and is a pixel-specific property. Therefore, L creates a probability estimate of existence of line-like structures and may represent continuous or fragmented curvilinear structures as well. Parameters $\alpha_1$ and $\alpha_2$ in Equation (6) are used to tune the response of normal line-like structures and corrupted line-like structures due to signal loss or image noise. In one example, normal line-like structures representing rail heads may have bright values inside along the line and dark values outside the structure (but note that this may be vice versa, depending on lighting conditions) and in this specific example, a rail would have $\lambda_1 \approx 0$ and $\lambda_2 \ll 0$. A larger $\alpha_1$ leads to a larger response in terms of the function L for small changes in the eigenvalues (i.e., higher sensitivity to line detection). However, when the line-like structure is corrupted due to signal loss, the intensity along the line becomes concave (i.e., no sharp boundaries), which means eigenvalues will be $\lambda_1 > 0$ and $\lambda_2 \ll 0$. A larger $\alpha_2$ may increase the response of this situation and make the corrupted line structure continuous. One set of reasonable parameter settings to enhance rail head structures in some preferred non-limiting example sensed images are shown in Table 1, below:

TABLE 1

Sample parameter settings for Hessian-based line/tubular feature enhancement

| Parameter | Value |
|---|---|
| $\sigma$ | 0.8 |
| $\alpha_1$ | 0.1 |
| $\alpha_2$ | 2.0 |

In order to tune the response of L so that different line widths may be combined and line structure of various widths may be identified, a Laplacian or Gaussian multi-scale approach may be applied to normalize the filter response. The maximum response in terms of L in the multiple Gaussian scales for a given pixel was considered as the final pixel-specific response of L, which was subsequently subjected to binary thresholding, connected-component filtering (i.e., to identify the largest connected components in a thresholded image result), and, finally, application of a Hough transform to the resulting data in order to obtain a quantitative/parametric representation of the rails seen in a given image frame.

Notice that the response of the similarity measure function L is a heuristic which does not include direction information and, in principle, the line-like structure detected via the function L may be further filtered based on the directions of pixels which is possible to establish from the minor eigenvector (i.e., corresponding to the lower of the two eigenvalues) of the Hessian matrix for a given pixel, as shown in equation (7), below:

$$A = \tan^{-1}\left(\frac{I_x}{I_y}\right) \quad (7)$$

where $I_x$ and $I_y$ are the two orthogonal components of the minor eigenvector of the Hessian matrix at a given pixel.

Using the values of A, it is possible to isolate/filter out line-like structures which are a specific angular orientation, prior to the steps of binary thresholding, connected-component filtering (i.e., to identify the largest connected components in a thresholded image result), and, finally, application of a Hough transform to quantify rail heads in the image.

In this manner, provided is an improved train monitoring system 1000, method of monitoring a train, and computer program product that provide the ability to determine track occupancy of the rail vehicle 12 and the upcoming direction of movement of the rail vehicle 12 based, at least in part, on static image data. Further, the train monitoring system 1000, the method, and the computer program product provide the additional safety feature of validating the determined track occupancy based, at least in part, on the determined upcoming direction of movement of the rail vehicle 12. Additionally, as an additional safety feature, the determined track occupancy and upcoming direction of movement of the rail vehicle 12 may be validated based, at least in part, on time series data including data from the sensor signals obtained at two or more different times.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment may be combined with one or more features of any other embodiment.

The invention claimed is:

1. A train monitoring system comprising:
an image sensor disposed on a rail vehicle and positioned to sense an area in front of the rail vehicle, the image sensor generating sensor signals; and
at least one non-transitory computer-readable medium comprising program instructions that, when executed by at least one processor in communication with the image sensor, cause the at least one processor to:
(a) generate static image data based, at least in part, on the sensor signals, the static image data comprising a line representation of rails located in the area in front of the rail vehicle;
(b) determine a track occupancy of the rail vehicle by determining a set of rails occupied by the rail vehicle based, at least in part, on the static image data;
(c) determine an upcoming direction of movement of the rail vehicle by determining a direction of the set of rails occupied by the rail vehicle based, at least in part, on the static image data; and
(d) validate the determined track occupancy based, at least in part, on the upcoming direction of movement of the rail vehicle,
wherein generating the static image data comprises filtering the sensor signals with a low pass filter to smoothen an instantaneous image of the area in front of the rail vehicle, and
wherein generating the static image data comprises generating an enhanced smoothened image to exaggerate pixels of the smoothened image that belong to substantially tubular structures in the area in front of the rail vehicle.

2. The train monitoring system of claim 1, wherein the program instructions, when executed by the at least one processor, further cause the at least one processor to validate the determined track occupancy of the rail vehicle and the determined upcoming direction of movement of the rail vehicle based, at least in part, on time series data, wherein the time series data comprises data from the sensor signals obtained at two or more different times.

3. The train monitoring system of claim 1, wherein determining the track occupancy of the rail vehicle further comprises determining a number of sets of rails located in the area in front of the rail vehicle.

4. The train monitoring system of claim 1, wherein the image sensor is a monochrome camera, an RGB camera without depth perception, or a depth-sensing camera.

5. The train monitoring system of claim 1, further comprising an on-board computer system in communication with the image sensor, the on-board computer system comprising the at least one processor configured to perform steps (a)-(d).

6. The train monitoring system of claim 1, wherein the at least one processor comprises a microprocessor dedicated solely to processing sensor data from the image sensor.

7. The train monitoring system of claim 1, wherein generating the static image data comprises determining two largest components in the enhanced smoothened image in each quantified angular direction category.

8. The train monitoring system of claim 7, wherein generating the static image data comprises quantifying lines corresponding to detected connected-component regions representing the rails in front of the rail vehicle in each quantified angular direction category.

9. The train monitoring system of claim 8, wherein generating the static image data comprises separating lines representing rails into categories based, at least in part, on relative slopes of the rails.

10. The train monitoring system of claim 1, wherein determining the upcoming direction of movement of the rail vehicle comprises determining an upcoming angular direction of the set of rails occupied by the rail vehicle.

11. The train monitoring system of claim 1, further comprising an event data recorder in communication with the at least one processor, the event data recorder configured to store information from the sensor signals.

12. The train monitoring system of claim 1, wherein the program instructions cause the processor to detect obstacles along the rails based, at least in part, on the sensor signals from the image sensor.

13. The train monitoring system of claim 1, wherein the program instructions cause the processor to evaluate a condition of the rails based, at least in part, on the sensor signals from the image sensor.

14. A method of monitoring a train comprising:
sensing an area in front of a rail vehicle using an image sensor, the image sensor generating sensor signals;
generating static image data based, at least in part, on the sensor signals with at least one processor in communication with the image sensor, wherein the static image data comprises a line representation of rails located in the area in front of the rail vehicle;
determining, with the at least one processor, track occupancy of the rail vehicle by determining a set of rails occupied by the rail vehicle based, at least in part, on the static image data;
determining, with the at least one processor, an upcoming direction of movement of the rail vehicle by determining a direction of the set of rails occupied by the rail vehicle based, at least in part, on the static image data; and
validating the determined track occupancy based, at least in part, on the upcoming direction of movement of the rail vehicle,
wherein generating the static image data comprises filtering the sensor signals with a low pass image filter to smoothen an instantaneous image of the area in front of the rail vehicle, and
wherein generating the static image data comprises generating an enhanced smoothened image to exaggerate pixels of the smoothened image that belong to substantially tubular structures in the area in front of the rail vehicle.

15. The method of claim 14, further comprising:
validating, with the at least one processor, the determined track occupancy of the rail vehicle and the determined upcoming direction of movement of the rail vehicle based, at least in part, on time series data, wherein the time series data comprises data from the sensor signals obtained at two or more different times.

16. The method of claim 14, further comprising:
determining the track occupancy of the rail vehicle further comprises determining a number of sets of rails located in the area in front of the rail vehicle.

17. The method of claim 14, wherein generating the static image data comprises determining two largest the two largest components in the enhanced smoothened image in each quantified angular direction category.

18. The method of claim 17, wherein generating the static image data comprises quantifying lines corresponding to detected connected-component regions representing the rails in front of the rail vehicle in each quantified angular direction category.

19. The method of claim 18, wherein generating the static image data comprises separating lines representing rails into categories based, at least in part, on relative slopes of the rails.

20. The method of claim 14, wherein determining the upcoming direction of movement of the rail vehicle comprises determining an upcoming angular direction of the set of rails occupied by the rail vehicle.

21. The method of claim 14, wherein an event data recorder is in communication with the at least one processor, the event data recorder configured to store information from the sensor signals.

22. The method of claim 14, wherein the at least one processor is configured to detect obstacles along the rails based, at least in part, on the sensor signals from the image sensor.

23. The method of claim 14, wherein the at least one processor is configured to evaluate a condition of the rails based, at least in part, on the sensor signals from the image sensor.

24. A computer program product comprising at least one non-transitory computer-readable medium including program instructions that, when executed by at least one computer including at least one processor, causes the computer to:
generate static image data based, at least in part, on sensor signals generated from an image sensor in communication with the at least one processor, wherein the image sensor is disposed on a rail vehicle and positioned to sense an area in front of the rail vehicle, wherein the static image data comprises a line representation of rails located in the area in front of the rail vehicle;
determine track occupancy of the rail vehicle by determining a set of rails occupied by the rail vehicle based, at least in part, on the static image data;
determine an upcoming direction of movement of the rail vehicle by determining a direction of the set of rails occupied by the rail vehicle based, at least in part, on the static image data; and
validate the determined track occupancy based, at least in part, on the upcoming direction of movement of the rail vehicle, wherein generating the static image data comprises filtering the sensor signals with a low pass image filter to smoothen an instantaneous image of the area in front of the rail vehicle, and wherein generating the static image data comprises generating an enhanced smoothened image to exaggerate pixels of the smoothened image that belong to substantially tubular structures in the area in front of the rail vehicle.

25. The computer program product of claim 24, wherein the program instructions cause the computer to validate the determined track occupancy of the rail vehicle and the determined upcoming direction of movement of the rail vehicle based, at least in part, on time series data, wherein the time series data comprises data from the sensor signals obtained at two or more different times.

26. The computer program product of claim 24, wherein determining the track occupancy of the rail vehicle further comprises determining a number of sets of rails located in the area in front of the rail vehicle.

27. The computer program product of claim 24, wherein determining the upcoming direction of movement of the rail vehicle comprises determining an upcoming angular direction of the set of rails occupied by the rail vehicle.

* * * * *

UNITED STATES PATENT AND TRADEMARK OFFICE
CERTIFICATE OF CORRECTION

PATENT NO. : 10,311,551 B2
APPLICATION NO. : 15/377451
DATED : June 4, 2019
INVENTOR(S) : Prahlad G. Menon Gopalakrishna Page 1 of 1

It is certified that error appears in the above-identified patent and that said Letters Patent is hereby corrected as shown below:

In the Claims

Column 20, Lines 17-18, Claim 17, after "largest" delete "the two largest"

Signed and Sealed this
Twenty-seventh Day of August, 2019

Andrei Iancu
*Director of the United States Patent and Trademark Office*